July 19, 1949.
G. C. COX
2,476,286
MARINE ELECTROCLEANING AND ELECTROPICKLING APPARATUS
Filed Aug. 23, 1944
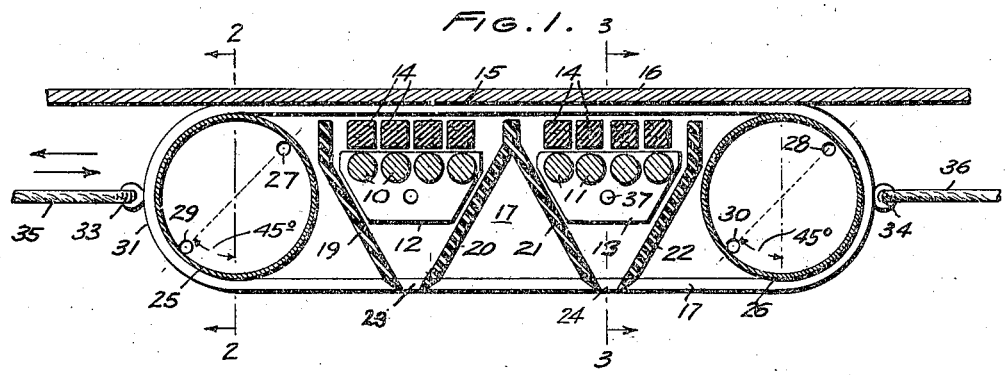
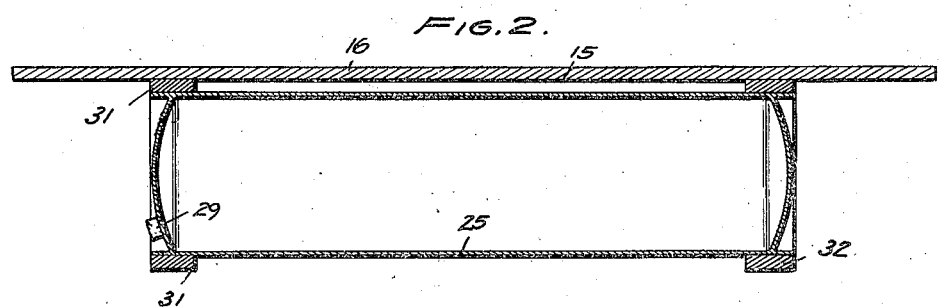
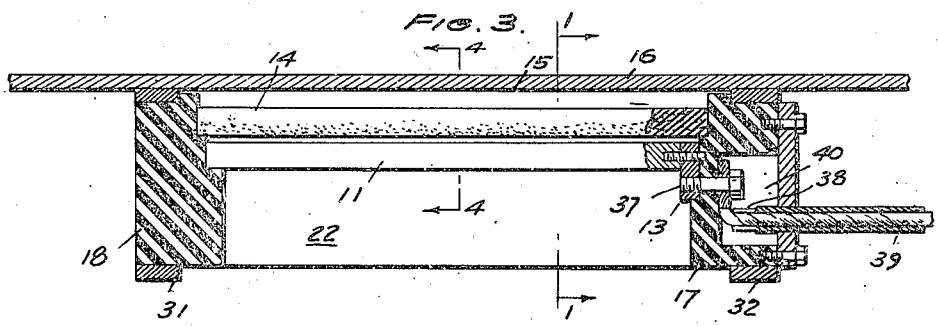
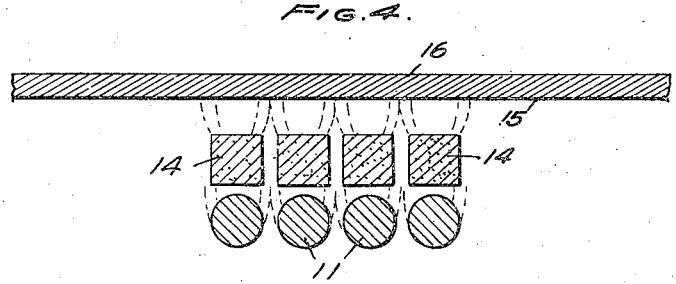
INVENTOR
GEORGE C. COX
BY William D. Hall
ATTORNEY Patented July 19, 1949

2,476,286

UNITED STATES PATENT OFFICE 2,476,286

MARINE ELECTROCLEANING AND ELECTRO-PICKLING APPARATUS

George Chandler Cox, Charleston, W. Va.

Application August 23, 1944, Serial No. 550,814

4 Claims. (Cl. 204—224)

(Granted under the act of March 3, 1883, as amended April 30, 1928; 370 O. G. 757)

The invention described herein may be manufactured and used by or for the Government for governmental purposes, without the payment of any royalty thereon.

This invention relates to improved types of apparatus for electrolytically cleaning or electrolytically pickling the metal hull of a ship or other metallic structure which is submerged in sea or sea port water.

One of the chief factors militating against the commercial use of such electrolytic methods for cleaning or pickling the hull of a ship is the danger that some piece of metal projecting from the hull may cause a short between the hull and the adjacent electrode. With the appreciable amount of power available, such a short would draw a heavy arc which could quickly cause considerable damage to the hull.

The primary object of this apparatus is to provide a simple economical and effective means of preventing a direct short between the main electrode members and the adjacent hull surface and of limiting any arc between the screening electrodes and adjacent hull surface to a value which is incapable of damaging the hull. These screening electrodes or bars should usually be of much higher conductivity than the electrolyte.

In Figures 1 to 4 inclusive, which represent schematic diagrams of the essential parts of the apparatus, similar numbers refer to similar parts.

Figure 1 is a schematic cross sectional view of one form of the apparatus, taken along the line 1—1 of Figure 3.

Figure 2 is a cross sectional view of Figure 1 along the lines 2—2 of Figure 1, showing the arrangement of a float tank.

Figure 3 is a cross sectional view of Figure 1 along the line 3—3 of Figure 1, showing the arrangement of the electrode supports and connections.

Figure 4 is a cross sectional view along the line 4—4 of Figure 3, showing in greater detail the means of effectively distributing the current over the surface to be cleaned. This view indicates the lines of current flow from the electrodes 11 to high conductivity screening bars 14 and to the metal surface 15 undergoing treatment.

Electrodes 10 and 11 are fastened to current distributing heads 12 and 13 respectively. The bars 14 are arranged between the electrodes 10 and 11 and the metal surface 15 to be cleaned. In the various figures the surface 15 to be cleaned is represented as being the bottom of a ship hull 16. The several parts 10, 11, 12, 13 and 14 are securely held by the frame members 17 and 18 which are substantially non-conducting. For simplicity in illustrating the essential parts, the frame members are shown as having considerable thickness; in actual construction these parts would be made as thin as is consistent with good engineering practice.

Current shields 19, 20, 21 and 22 are also securely held by the frame members 17 and 18. These current shields are substantially non-conducting and extend the full length of the electrodes. These shields should be set at such an angle from the vertical that any fouling matter, rust or other sludge which falls between the electrodes will slide down the sides of the shields and out the bottom through the openings 23 and 24. The efficiency of the device is a function of the ability to concentrate high current densities upon the surface area undergoing treatment at any specific time. If non-conducting shields could be continuous around the side of the electrodes away from the work and could extend up against the work the leakage current loss would be zero and the current efficiency of the device would be a maximum. Obviously such a situation is impractical and the long narrow openings 23 and 24 are therefore provided for the discharge of waste matter. If these openings are made only sufficiently wide to discharge waste matter the leakage currents will not be excessively large as has been determined by various tests in regard to practical and useful shielding methods. Furthermore, these openings 23 and 24 serve another essential purpose which is that of supplying an ample circulation of fresh sea water to the device without which the voltage efficiency soon drops off due to the depletion of conducting ions in the paths of high current density.

As illustrated in Figures 1 and 2 this specific apparatus for cleaning ship bottoms has cylindrical float chambers 25 and 26 built into each end of the apparatus. For small cleaning equipments these chambers can be made of the proper size to keep the equipment barely floating. However, for the convenience of handling large equipments the float chambers should be made like diving bells with hose connections 27 and 28 for admitting or removing compressed air and with water vent holes 29 and 30 for forcing out or letting in a proper amount of water ballast to give the desired upward pressure on the bottom of the ship. Because the same apparatus must be able to clean the vertical sides of the ship, the hose connections and the water vent holes are usually located at 45 degrees from the vertical or horizontal as shown.

As illustrated, the entire equipment is held firmly together by steel bands 31 and 32 at each end of the frame assembly. These bands act as sled runners and should extend continuously around the frame assembly in such a fashion that the equipment will slide on the bottom of the ship even if it should be accidentally turned upside down. To these bands 31 and 32 cable eyes 33 and 34 are generally attached. To these cable eyes are attached cable bridles 35 and 36 for pulling the equipment in either direction across the bottom of the ship as desired.

As illustrated in Figure 3 the electrodes 11 and distributing head 13 are made of metal, either iron or steel; although with slight modifications graphite or other non-metallic electrode material may be used. Into the distributing head 13 is screwed a current conducting bolt 37 under which the cable terminal lug 38 is fastened. Into the cable lug 38 is brazed or soldered the flexible insulated power cable 39 which leads to the desired high amperage power source, the other terminal of which is generally connected to the ship. To prevent corrosion of the current carrying bolt 37 and terminal lug 38, the terminal box 40 is generally filled with some standard sealing compound like "pothead compound." Another current carrying cable not shown is connected to the current distributing head 12 in a similar manner as above described.

One or more current distributing heads may be used in such an apparatus depending upon whether cleaning or pickling is desired and upon whether direct current is to be equally divided between each distributing head. If alternating currents or pulsating direct currents are used with this apparatus, the number of separately controlled or operated heads will depend upon the specific results which are desired. It is thus seen that the apparatus and method of operation thereof is quite flexible and can be connected for various specific cleaning or pickling uses without departing from the principles herein set forth.

Having described the apparatus more or less in detail as well as the various secondary objects thereof, the primary object of this apparatus will now be discussed. As previously mentioned the primary object of this equipment is to effect a high concentration of current on a given area of hull surface with a minimum expenditure of power and at the same time to prevent the accidental formation of an arc to the hull of a ship which would damage the ship. The desired protection is afforded and efficiency increased by interposing a set of bars 14 of high electrical conductivity between the electrodes 10 and 11 and the surface 15 which is to be cleaned. The cross section of these bars 14 and the electrodes 10 and 11 is round, square or rectangular as required to meet the specific desired design.

The overall efficiency depends not only upon the current efficiency which has been discussed but also upon the voltage efficiency which will now be discussed. Obviously the voltage efficiency will be a maximum when a minimum voltage drop occurs between the hull 15 and the electrodes 10 or 11. Referring to Figure 4, if the resistance can be reduced between the electrodes 11 and surface 15 undergoing treatment the voltage drop will be reduced almost in a direct proportion thereto. Therefore by placing bars 14 of high conductivity in comparison to sea water in the paths of current flow between the electrodes 11 and the surface 15 undergoing treatment, the overall resistance is materially reduced and similarly the voltage efficiency is raised. In other words the effective gap between the hull of the ship and the electrodes 10 or 11 can be made a minimum by interposing such conducting bars 14 between this surface and its coacting electrodes. Furthermore, these bars 14 have the important function of preventing a direct short circuit of the power source which could occur if these bars were not used. For example, in normal operation with approximately equal conductance in the two water gaps, a short from the ship hull to the bar 14 would not even double the current flow from the one coacting electrode and no damage could be done. This type of safety gap becomes very important where large powered multiple electrode cleaning or pickling units are in use.

Another function of such an arrangement embodying an electrode and a coacting bar 14 of high electrical conductivity in an electrolytic path of high current flow is that the current is distributed more uniformly over the surface undergoing treatment. This condition is illustrated in Figure 4.

For convenience in clearly illustrating the principles and essential parts involved, the electrodes 10 and 11 and the high conductivity bars 14 are shown with their axes at right angles to the direction of movement of the apparatus as illustrated by the two arrows near the cable 35 of Figure 1. However, it is often desirable particularly with large equipments to have the axes of these electrodes 10 and 11 and the high conductivity bars 14 parallel to the direction of motion of the apparatus.

This equipment can be described as comprising one or more electrodes 10 or 11 of opposite polarity to the metal surface 15 undergoing treatment and adjacent thereto, and one or more bars 14 of materially higher conductivity than the electrolyte which are interposed in the paths of optimum current flow between the metal surface 15 and the one or more electrodes 10 or 11. An apparatus incorporating the above features may also include a high resistance shield almost completely surrounding the electrodes on the side of the electrodes opposite to the surface undergoing treatment if desired. An apparatus incorporating all of the above features may also have one or more floats firmly attached to the above parts, the bouyancy of which may be controlled at will.

The invention may be regarded in broad terms as essentially an apparatus comprising a main electrode of opposite polarity to that of the ship's hull, mounting means for said electrode positioning it adjacent the hull, a secondary electrode mounted on said mounting means and positioned between the main electrode and the hull, spacing means separating the main and secondary electrodes so as to insure that the effective distance between them is sufficient to allow the sea water electrolyte to act as a current limiting resistance and control or prevent arcing or other destructive current flow. It is desirable that the secondary electrode have a low effective resistance.

It should be noted that the grouping of the essential parts as herein shown is illustrative of one useful embodiment of this invention and that the physical rearrangement of these parts may be made as found necessary for each specific application thereof, and in accordance with the appended claims.

Having now described my invention, I claim:

1. Apparatus for electrolytically cleaning the surface of metal parts which are submerged in an electrolyte, comprising a frame, a plurality of elongated electrodes mounted in said frame, a plurality of elongated highly conductive elements mounted in said frame between said electrodes and the surface to be cleaned and electrically insulated from and spaced from said electrodes, said highly conductive elements being in a plane parallel to said electrodes, electric current shields partially surrounding said electrodes and highly conductive members, said shields being situated to collect material removed from the surface being cleaned to direct such material away from the electrodes and highly conductive elements, and means to cause an electric current to flow between said electrodes and the surface to be cleaned.

2. Apparatus for electrolytically cleaning the surface of metal parts which are submerged in an electrolyte, comprising a frame, a plurality of elongated electrodes mounted in said frame, a plurality of elongated elements of higher conductivity than said electrolyte and mounted in said frame between said electrodes and the surface to be cleaned, said conductive elements being insulated from direct electrical contact with said electrodes, electric current shields partially surrounding said electrodes and conductive members, said shields also mounted upon said frame and arranged to collect material removed from the surface being cleaned so that the collected material is directed away from said electrodes and conductive elements, means to cause an electric current to flow between said electrodes and the surface to be cleaned through said conductive elements, and means for moving said frame along the surface to be cleaned.

3. Apparatus for electrolytically cleaning the surface of metal parts which are submerged in an electrolyte, comprising a frame, a plurality of elongated electrodes mounted in said frame, a plurality of elongated elements of higher conductivity than said electrolyte and mounted in said frame between said electrodes and the surface to be cleaned, said conductive elements being mounted parallel to said electrodes and insulated from direct electrical contact with said electrodes, electric current shields partially surrounding said electrodes and conductive members, said shields also mounted upon said frame and arranged to collect material removed from the surface being cleaned so that the collected material is directed away from said electrodes and conductive elements, means to cause an electric current to flow between said electrodes and the surface to be cleaned through said conductive elements, and means for moving said frame along the surface to be cleaned, said frame including buoyant means.

4. Apparatus for electrolytically cleaning the surface of metal parts which are submerged in an electrolyte comprising a frame, a plurality of elongated electrodes mounted in said frame, a plurality of elongated highly conductive elements mounted in said frame between said electrodes and the surface to be cleaned and electrically insulated from and spaced from said electrodes, electric current shields partially surrounding said electrodes and highly conductive members, said shields being situated to collect material removed from the surface being cleaned to direct such material away from the electrodes and highly conductive elements, and means to cause an electric current to flow between said electrodes and the surface to be cleaned.

GEORGE CHANDLER COX.

REFERENCES CITED

The following references are of record in the file of this patent:

UNITED STATES PATENTS

| Number | Name | Date |
|---|---|---|
| 498,707 | Crane | May 30, 1893 |
| 820,105 | Frazier | May 8, 1906 |
| 981,922 | Frazier | Jan. 17, 1911 |
| 1,154,092 | Burdett | Sept. 21, 1915 |
| 1,794,973 | McBride | Mar. 3, 1931 |
| 1,850,426 | Tyrrell | Mar. 22, 1932 |
| 2,200,469 | Cox | May 14, 1940 |
| 2,232,019 | Beckwith | Feb. 18, 1941 |
| 2,319,624 | Olsen | May 18, 1943 |

FOREIGN PATENTS

| Number | Country | Date |
|---|---|---|
| 26,504 | Great Britain | 1912 |

OTHER REFERENCES

"Electroplating with Chromium Copper and Nickel," Freeman and Hoppe, 1930, p. 128.

Metal Industry, April 28, 1944, "The Distribution of Electrodeposits," p. 267.